JACQUES BOUDES
INVENTOR.

BY Norman J. Blodgett

United States Patent Office 3,420,472
Patented Jan. 7, 1969

3,420,472
HELICOPTER HAVING IN HORIZONTAL FLIGHT THE CHARACTERISTICS OF AN AIRPLANE
Jacques Boudes, 132 Blvd. de la Liberation,
13 Marseille 4, France
Filed Feb. 20, 1967, Ser. No. 617,141
Claims priority, application France, Feb. 21, 1966,
21,322
U.S. Cl. 244—7     6 Claims
Int. Cl. B64c 27/22; B64c 27/82

ABSTRACT OF THE DISCLOSURE

This invention has to do with an aircraft and, more particularly, to apparatus permitting vertical takeoff and landing and, alternatively, horizontal flight.

*Background of the invention*

In the present day state of technical development, and in spite of all the latest improvements introduced into the design of helicopters (such as increases in engine power, rotor arrangement, the addition of a supplementary propeller for horizontal flight and many other improvements) they have many disadvantages, the most important of which are recited below. For one thing, they have a low cruising speed, a high fuel consumption, there is difficulty in flying in strong winds, and they need a relatively large, free area for landing and takeoff as compared to the rotor diameter. Furthermore, there is a risk of blade damage as well as complete lack of safety in the case where the blades are damaged. Furthermore, the great mechanical complexity of these devices results in excessively high original cost and involves very careful maintenance supervision.

For these reasons, research has been carried out to find solutions to the disadvantages of helicopters and many of these discoveries have been embodied in the machine described herein. In particular, with regard to machines capable of vertical takeoff and having horizontal flight characteristics comparable to those of conventional airplanes, it should be noted that the techniques are quite different. Many such aircraft have been equipped with jet engines or auxiliary propellers for vertical thrust and there are the types that are fitted with propeller-type or jet engines having adjustable directions of flight by changing their own inclination or that of the wings which support them. Those airplanes, which are equipped with two propellers because of the antitorque effect and provided with engines of excessive power in order to achieve vertical takeoff, are really in effect only airplanes provided with more powerful engines and larger propellers. The complexity of such machines, their excessive cost, as well as the fact that they are difficult to pilot, dictates that they can be used only for military and governmental purposes and they are outside of the availability to individual users.

There is also the craft which are called "the flying tube" or coleopter. In these aircraft, the rotors, propellers or jet engines are placed at the rear of the fuselage, as is the fairing which is quite long in order to compensate for the almost entire absence of wings. This arrangement allows good visibility to the pilot who is facing forward, but also involves a wrong distribution of loads. Furthermore, they have practically no lifting capacity at low speed and this brings about a lack of stability. Even if these craft are provided with small wings with fairings, they are all placed in the propeller suction area instead of being in the propeller wash. Such machines have been equipped either with two propellers or with jet engines. Even if the pilot seat is of the pivoting type, instruments do not go along with the seat and the piloting of such craft has been found to be so dangerous that they have been completely abandoned.

Another type of helicopter described in the prior art is that described in the U.S. Patent No. 3,106,370 of Sudrow. This particular aircraft was designed to achieve vertical take-off and horizontal flight by simple translation with all of its disadvantages, such as excessive fuel consumption and slowness. It is, in fact, a classic helicopter having the advantages of reduced overall dimensions and simple construction. The antitorque effect is obtained by two propellers rotating in opposite directions. Such a machine cannot fly horizontally and possesses none of the advantages of the present construction. These and other difficulties experienced with the prior art devices have been obviated in a novel manner by the present invention.

It is, therefore, an outstanding object of the invention to provide an aircraft having small dimension intended for rapid and economic transportation for one or more persons.

Another object of this invention is the provision of an aircraft which is relatively easy to pilot and has a radius of action comparable to that of conventional private planes.

A further object of the present invention is the provision of an aircraft having a fuel consumption, maintenance cost, and initial cost price approaching that of a first-class automobile.

It is another object of the instant invention to provide an aircraft providing total security even in case of breakdown, ability to take off and land on any kind of site, and ability to fly horizontally in the same conditions of speed and economy as present private planes.

A still further object of the invention is the provision of an aircraft providing characteristics of horizontal flight and security which differ completely from anything hitherto constructed and to eliminate the main disadvantages of helicopter flight.

It is a further object of the invention to provide an aircraft in which propeller torque is taken care of in a novel manner which is relatively inexpensive.

It is a still further object of the present invention to provide an aircraft capable of vertical take-off and landing and horizontal flight, wherein the pilot and all of his attendant instruments and controls remain in their ormal positioning relative to him.

With these and other objects in view, as will be apparent to those skilled in the art, the invention resides in the combination of parts set forth in the specification and covered by the claims appended hereto.

*Summary of the invention*

In general, the present invention is a vehicle having an elongated fuselage which, in normal takeoff and landing, is arranged vertically. It has a large propeller arranged transversely at one end and there are supporting members extending from the other end. Wings extend longitudinally along the fuselage for use in horizontal flight and the pilot seat is pivotally movable along with the entire control console as the aircraft moves from vertical flight to horizontal flight. A parachute is arranged in the nose of the propeller and the propeller is surrounded with a large tubular housing which is supported by braces extending to the other end of the fuselage. Large adjustable vanes are provided along the fuselage to take care of torque.

More specifically, a single fixed rotor propellor is enclosed in a cylindrical fairing placed in the front of the aircraft to assure (by both its arrangement and its shape) stability in all flying positions. Uniform distribution of loads and maximum efficiency of windlift are provided. Antitorque flaps are provided as well as a rudder and there is a minimum reaction to crosswinds. The aircraft presents an acceptable compromise between vertical takeoff using the blade surface and horizontal flight speed at least equal to that of airplanes and having the same engine power. Due to their position, the blades are protected against lateral shock and are also inaccessible from the ground. The lateral wings lie in the propeller wash and give sufficient lift increased by that of the cylindrical propeller fairing. The antitorque adjustable flaps operate in proportion to the amount of torque. The use of these adjustable flaps permits the elimination of a second propeller to rotate in the opposite direction. In addition, the action of the flaps is almost entirely nullified at high speed due to wing stability. The rudder and elevator flaps are arranged in the propeller backwash to assure better efficiency and flexibility of control. These flaps are also protected from possible damage should the machine land on uneven ground. The pilot's seat incorporates a control column grouping all the controls for aspect, direction, adjustment of torque, and the engine in a special console. The instrument panel is also provided with all the instruments for control, the entire console being fixed on a frame which is capable of rotating about 90° on a tubular axis. This arrangement allows the pilot to remain always in the most suitable position without bringing about any wear on the control cables and not requiring any particular adjustment, either mechanical or electrical. The necessary visibility is easily obtained in all directions by use of transparent panels or windows. The parachute is arranged under a special cowling placed in front of the rotor of the propeller. In the case of a breakdown, these parachutes are projected outside of the propeller's field of activity and permit the machine to land without danger either to the passengers or to the apparatus, regardless of the position of the machine in flight at the time that the breakdown takes place.

*Brief description of the drawings*

The character of the invention, however, may be best understood by reference to one of its structural forms, as illustrated by the accompanying drawings, in which.

*Description of the preferred embodiment*

Figure 1:
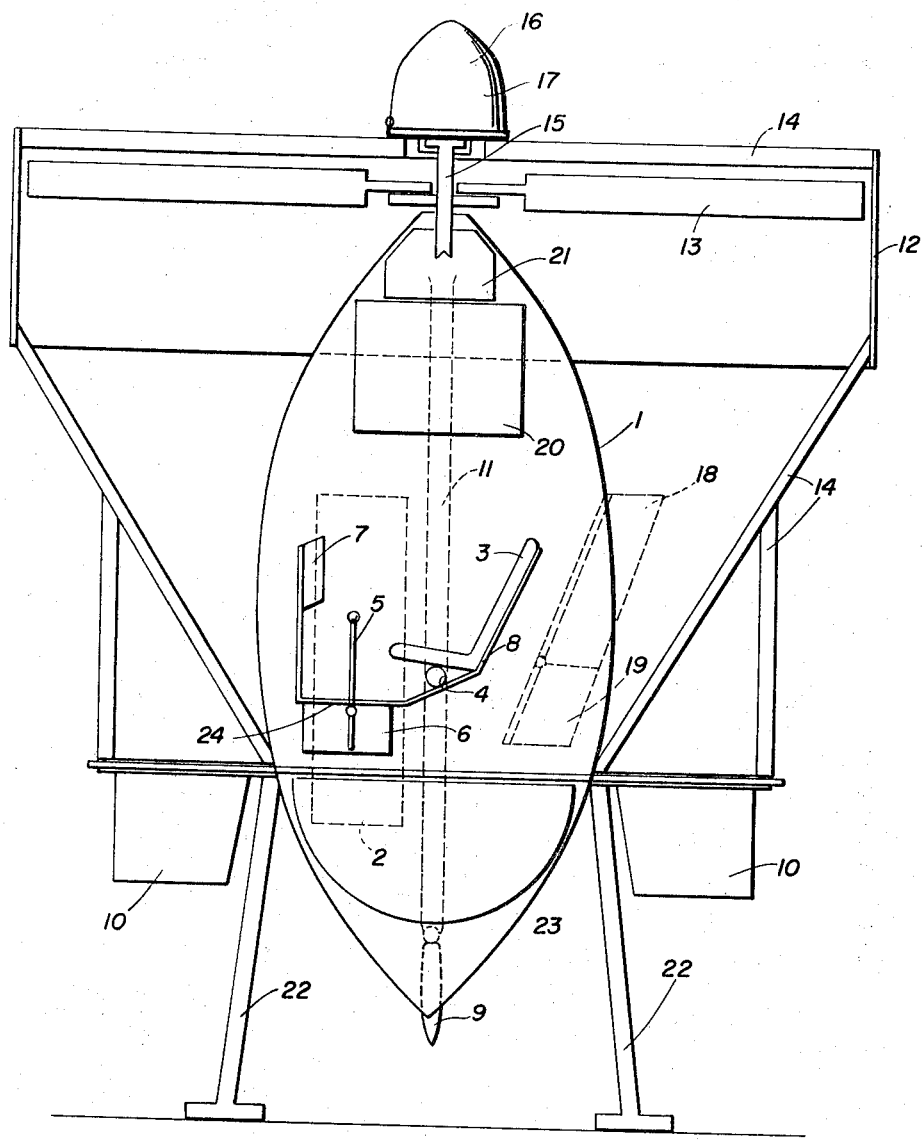
FIG. 1 is a vertical elevational view of the aircraft shown in position on the ground before takeoff.
Figure 2:
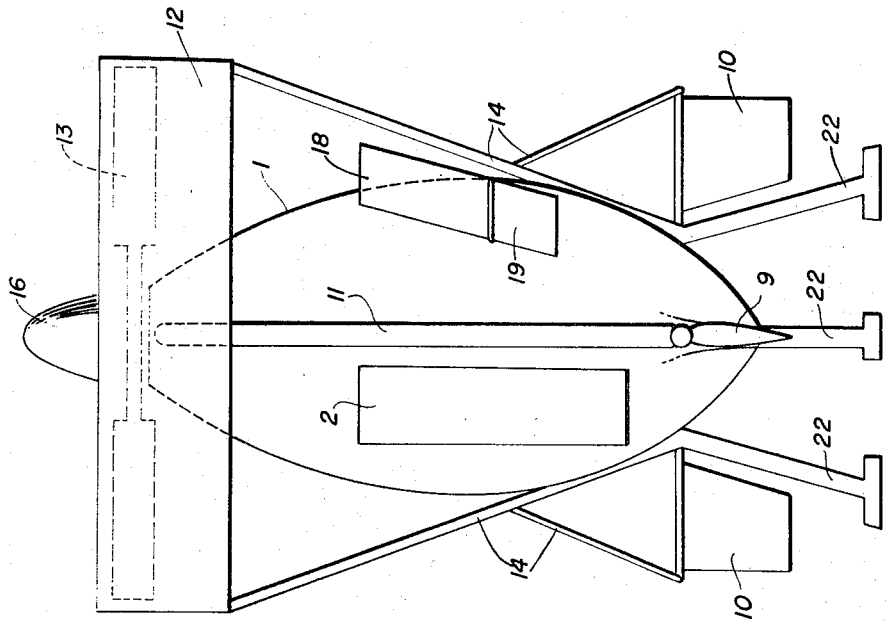
FIG. 2 is a side elevational view of the aircraft in horizontal flight.
Figure 3:
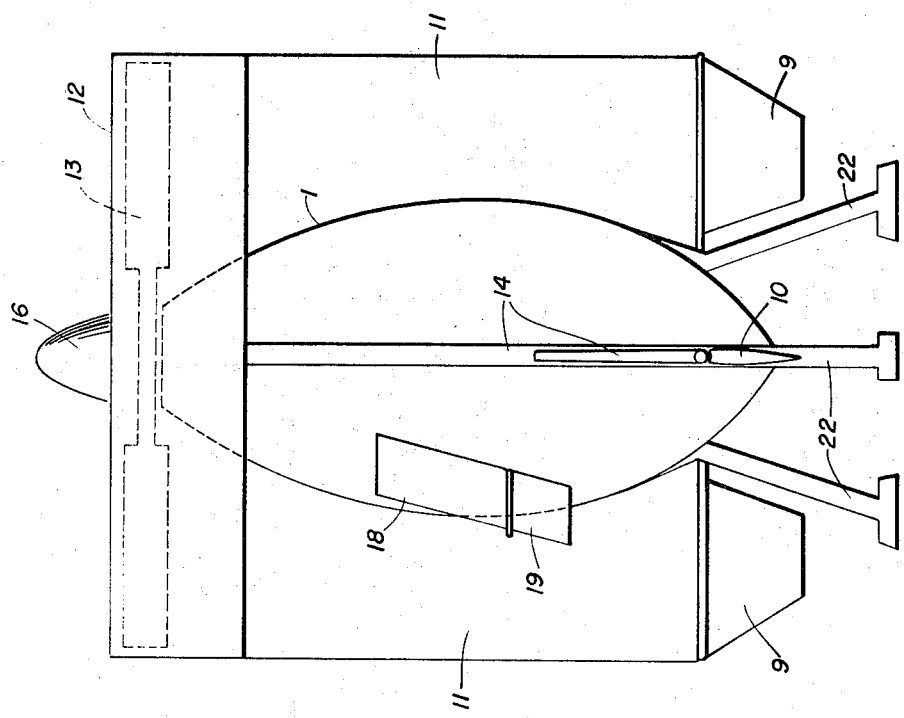
FIG. 3 is a plan view of the aircraft in horizontal flight.

Referring first to FIGS. 1, 2, and 3, the fuselage 1 is an aerodynamic shape and is in the general form of a prolate spheroid or football shape. This is a closed compartment and access is provided by a side door 2. The pilot's seat 3 is mounted on a frame 8 which, in turn, is mounted on a hollow axle 4 for tilting 90° relative to the longitudinal axis of the fuselage. The control column 5, which is also provided with a rudder bar, operates through a transmission box 6 which contains control cables; an instrument board 7 is also fixed to the common main frame 8. In this way, the instruments and controls follow the 90° movement of the seat 3 around the axle 4 in accordance with the different positions during flight. This takes place without any possible damage to the mechanical and electrical cables. All these cables pass through the hollow tube of the axle 4 and lead to the various operational components and engines. The seat 3 is movable about the axle 4 by means of foot pressure on a floor board 24 located in the fuselage beside the frame 8 in conjunction with a handwheel 25 located beside the seat 3. A brake is operative between the axle 4 and the fixed support 24 to enable the pilot to release the seat at his discretion in order to change its position.

An elevator 9 and a rudder 10 are placed in the most convenient positions from the point of view of ease of operation and movement and also for protection from damage. Lateral wings 11 are fixed on each side of the machine. Their shape and position are designed to insure maximum surface and lift with minimum lateral space, as well as drag. A tubular housing 12 surrounds the propeller 13 and serves the function of protecting the propeller from lateral shocks which are catastrophic for helicopters. It also increases the propeller suction efficiency and proves the vertical lifting force and maneuverability. The fixing of this housing on the wings 11 improves the rigidity of the entire set of components outside the fuselage 1. Additional supports 14 are provided for holding the housing 12 in place. An ogival cowling 16 contains a parachute 17 that is fixed on the centerline of the housing 12 in line with the axis of the propeller. To avoid deformation of the housing 12 under the pulling effect caused by the opening of the parachute, some of the supports 14 extend radially inwardly toward the axis of the propeller to a support resting below a widened part of the axle under the effect of the propeller pull. The parachute 17 is of a type which opens automatically by means of a mechanism which comes into operation as soon as the cowl 16 is completely opened laterally, this mechanism being operated by a control placed close to the pilot's right hand. In case of engine failure, this parachute allows the helicopter to make a "soft" landing without danger even at low altitudes.

The propeller 13 is mounted on a single rotor and in the same manner as in conventional airplanes. Its characteristics, such as diameter, number of blades, their inclination, and so on, are determined experimentally to provide the best efficiency for its double role of vertical lift and horizontal flight. The antitorque effect is obtained by the use of ailerons 18 fixed to the fuselage 1. They are mounted on the fuselage in directly opposite locations comparable to two blades of a propeller. The angle of inclination facing the air flow is arranged so that, under the action of the prop wash, a counterrotating torque is imparted to the fuselage. This counterrotating torque balances the torque of the propeller. Additional flaps 19 allow this action to make the machine turn around its own axis and the action can be reduced or strengthened as required in one direction or the other.

The engine 20 is of a well-known type. Arrangements for lubrication and carburation must be such that they will not be affected by the various flight positions. The transmission coupling 21 has a torque and speed variation arrangement which are well known in the art.

The legs 22 are three in number, are telescopic, and are provided with shock absorbers in order to soften the landing. The fuel tank 23 is located at the rear of the fuselage and the fuel line going to the motor 20 must be arranged to be operative regardless of the position of the fuselage in space. This may be done, for instance, by having a fuel plunger which is positioned at the end of a flexible arm fixed at a central point, so that the end of the plunger remains always at the lowest point of the tank regardless of the position of the aircraft.

Figure 4:
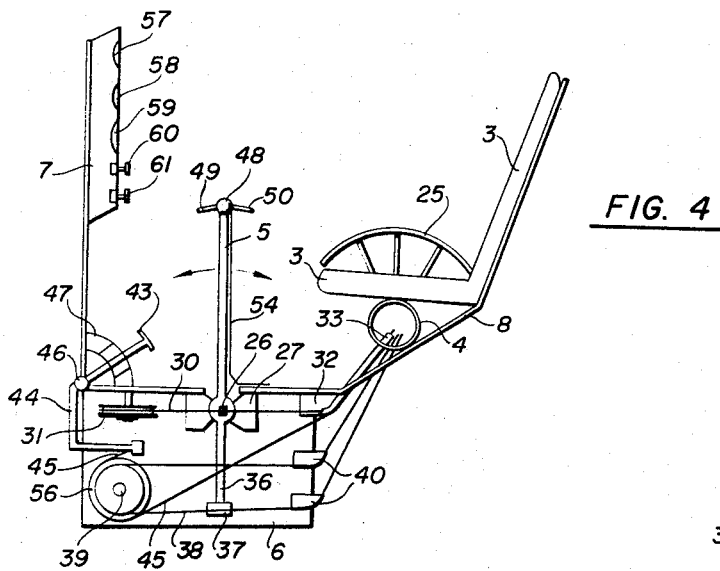
FIG. 4 is a vertical sectional view of the pilot console.
Figure 5:
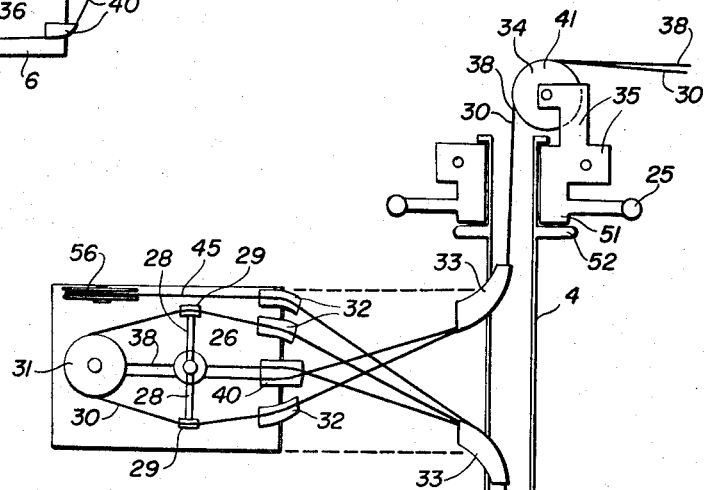
FIG. 5 is a horizontal sectional view of the pilot console.
Figure 6:
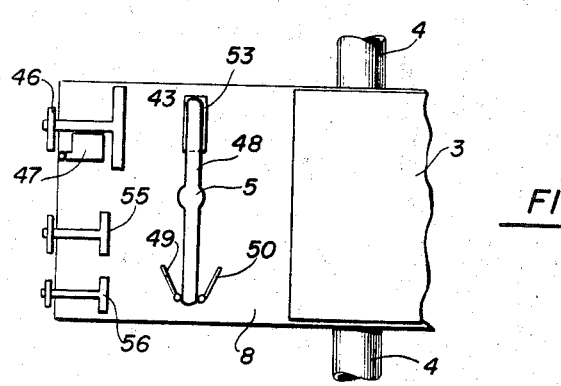
FIG. 6 is a horizontal view of the pilot console.

Referring now to FIGS. 4, 5, and 6, the pilot seat 3 is shown as mounted on the frame 8 which, in turn, is pivoted on the hollow axle 4. The control column 5 is also attached to the support 8 and, due to a pivotal bearing joint 26, can be moved relative to the transmission box 6 within a bearing 27. As shown in FIG. 5, the levers 28 are fixed to the center of the bearing joint 26 and these levers, when turned, operate through cable clamps 29 to pull the cable 30 around a sheave 31. The cable leaves the transmission box 6, passes over grooved guides 32 and 33. In this way, its two ends are directed through the hollow axle 4 toward sheaves 34 supported by frames 35 which serve as fixed points on the interior of the fuselage and do not take part in the rotation of the axle 4. From these sheaves the ropes are directed to their working connections to the rudders 10.

Referring to FIG. 4, when the column 5 is moved back and forth, the extension 36 operates through a cable clamp 37 on the cable 38. The cable is pulled over a sheave 39, which sheave may be inclined to assist the cable movement. Two parts of this cable 38 pass over grooved guides 40 and 33 and are directed through the hollow axle 4 toward two sheaves 41, each of which is mounted on the same axis 42 as the sheaves 34. The ends of this cable 38 control the elevators 9. A pedal 43, shown in FIGS. 4 and 6, pivots around an axle 46 and, by means of a lever 44, operates a cable 45 which is fixed to the end of the lever. Referring to FIG. 5, this cable is directed around a sheave 56 and then toward the hollow axle 4 from which it proceeds to a sheave 62 and to the antitorque flaps 19.

As is best evident in FIG. 6, a lateral lever 48 associated with the control lever 5 is provided with two handles 49 and 50 which serve to operate the controls releasing the devices which lock the pivotal bearing joint 26 in the bearing box 27 and also the seat 3 in its pivotal movement about the axle 4. The handwheel 25 is locked by a plate 51 which is fixed to the wheel 25 and a plate 52 is fixed to the seat and to the axle, as shown in FIG. 5. A handle 53 (preferably of the rotary type) is positioned on the same lateral lever 48 and its purpose is to operate on a cable 54 which runs in a protective conduit and which controls carburation. A pedal 55 operates through a conventional mechanical transmission to regulate the locking brake 47 of the pedal 43, which, it will be recalled, operates the antitorque flaps 19.

The instrument board 7 shown in FIG. 4 groups all of the instruments necessary for control; that is to say, instruments 57, 58, and 59 and the operational pushbuttons 60 and 61. A parachute release device (not shown) is of a lever type and is positioned in a convenient location near the frame 8 to be easily reached by hand; provision is made, however, to assure that it cannot be operated by accident. The control cable for the release of the parachute would pass through the hollow axle 4 in the same method as the other cables. All mechanical linkage cable and electrical wires leading to the instrument board 7 run in a protective conduit fixed to the frame 8 and then pass through the hollow axle 4 toward the open ends on their way to the various working parts of the aircraft. The various controls are arranged according to the method which would appear to be most suitable from a functional point of view.

The operation of the invention will now be readily understood in view of the above description. Using the controls which are associated with the control column 5, vertical take-off is normally carried out simply by accelerating the engine. During windy weather, however, the various steering flaps must be brought into operation. In such a case, it is preferable to position the machine so that the lateral wings 11 are in line with the direction of the wind to avoid pressure against the wing. As the rotor air flow acts on all of the operational components, the wind effect is much easier to compensate for than in existing types of helicopters. Once the machine has reached a height clear of obstacles, the pilot may begin to take a more pronounced horizontal course. This operation is carried out by operating the elevators 9 and accelerating the engine at the same time. The aircraft is brought back to the vertical position by operating the elevators 9 after having made a short climb or chandelle. For landing, the procedure is similar, but the engine speed is, of course, adjusted. Finally, slow horizontal movement can be obtained by moving the helicopter along at a slight inclination to the vertical, as one would do in changing from vertical flying to horizontal flying.

The principal advantages of this new aircraft are, therefore, considerable when compared with previously existing aircraft. In vertical takeoff and for landing the operating landing area required is small, the action of the wind can be nullified more easily, and the danger of damaging the blades is maintained at a minimum. For vertical flight and hovering, the present aircraft gives greater flexibility and quicker orientation. For horizontal flight, the aircraft operates as an ordinary winged airplane with the propeller in front; speed, maneuverability, and efficiency are equivalent to those of an airplane with an engine of the same power. In its flight safety characteristics, crash landing is rendered practically impossible due to the fact that the flaps are protected by the tubular housing 12 and the parachute 17 may be made operative. Piloting is also simplier and easier.

In its constructional characteristics, it should be noted that the most expensive components used normally in helicopter construction have been eliminated. The mechanism in the present case is very simple and, therefore, the original cost price, the cost of maintenance, and the cost of operation may place this new machine within the reach of a broad section of the public.

The invention having been thus described, what is claimed as new and desired to be secured by Letters Patent is:

1. An aircraft capable of vertical takeoff and horizontal flight, comprising
   (a) a fuselage,
   (b) a rotor with a propeller having a plurality of blades mounted at one end of the fuselage and contained in a tubular housing,
   (c) two lateral wings extending from the fuselage and two rudders and two elevators positioned symmetrically at the rear of the fuselage,
   (d) a pilot seat capable of tilting 90° at the pilot's will and so designed that all operational and controlling components and devices accompany the seat during this tilting movement, the pilot seat being provided with a general framework rotating around the axis of a transverse tubular axle,
   (e) a control column complete with transmission case fixed to the framework, and
   (f) an instrument board fixed to the front of the framework complete with all the control devices and components, these controls being placed on the framework within reach of the pilot's hand or foot to insure that he is not restricted in any way during the change of position in flight.

2. An aircraft as recited in claim 1, wherein the control column is operative to control the rudders and elevators and is associated with a transmission case containing the operational cables, the control column including a transverse bar, and wherein the controls include a device for locking the seat relative to the said axis and a device for controlling the engine acceleration, the transmission case including an arrangement of guides and sheaves assuring that the cables are not constrained or damaged during operation.

3. An aircraft as recited in claim 1, wherein two freely adjustable flaps are located on the fuselage body in such a way as to create therewith a torque proportional and opposite in direction to rotor torque.

4. An aircraft as recited in claim 1, wherein the two fixed wings have a width substantially equal to that of the housing around the propeller.

5. An aircraft as recited in claim 1, wherein a parachute is located on the axis of the rotor outside of the housing and the parachute may be released automatically by apparatus located adjacent the pilot seat.

6. An aircraft as recited in claim 1, wherein telescopic legs are provided at the rear of the fuselage for landing, the legs including shock-absorbing elements.

References Cited

UNITED STATES PATENTS

| 2,479,125 | 8/1949 | Leonard | 244—7 |
| 2,673,051 | 3/1954 | Frost | 244—7 X |
| 2,859,003 | 11/1958 | Servanty | 244—12 |
| 3,036,794 | 5/1962 | Mallinckrodt | 244—12 |

OTHER REFERENCES

Official U.S. Navy Photograph, Apr. 25, 1955, Convair "Pogo" Aircraft.

MILTON BUCHLER, *Primary Examiner.*

T. W. BUCKMAN, *Assistant Examiner.*

U.S. Cl. X.R.

244—17.19, 83